United States Patent
McPherson

(10) Patent No.: US 8,590,728 B1
(45) Date of Patent: Nov. 26, 2013

(54) BOIL-TOLERANT COOKWARE

(75) Inventor: Mathew A. McPherson, Norwalk, WI (US)

(73) Assignee: MAMC, LLC, Sparta, WI (US)

(*) Notice: Subject to any disclaimer, the term of this patent is extended or adjusted under 35 U.S.C. 154(b) by 0 days.

(21) Appl. No.: 13/438,699

(22) Filed: Apr. 3, 2012

Related U.S. Application Data

(60) Provisional application No. 61/604,075, filed on Feb. 28, 2012.

(51) Int. Cl.
*A47J 36/02* (2006.01)

(52) U.S. Cl.
CPC .................................. *A47J 36/02* (2013.01)
USPC ...................................... 220/573.1; 220/373

(58) Field of Classification Search
CPC . A47J 36/02; B65D 51/1611; B65D 51/1605; B65D 51/16
USPC ............. 220/573.1, 573.5, 573.4, 573.2, 373, 220/367.1, 369, 912; 99/410, 403; 126/384.1, 383.1, 373.1
IPC ...................................................... B65D 51/16
See application file for complete search history.

(56) References Cited

U.S. PATENT DOCUMENTS

| | | | |
|---|---|---|---|
| 53,421 A * | 3/1866 | Dembois | 126/384.1 |
| 86,385 A | 2/1869 | Friedander | |
| 310,468 A | 1/1885 | Schimper et al. | |
| 504,243 A | 8/1893 | Philippot | |
| 761,498 A | 5/1904 | Kampfe | |
| 1,039,140 A | 9/1912 | Kampfe | |
| 1,122,307 A | 12/1914 | Rhodes | |
| 1,228,108 A | 5/1917 | Gologan | |
| 1,264,348 A | 4/1919 | Toth | |
| 1,414,540 A | 5/1922 | Young | |
| 1,461,366 A | 7/1923 | Mulford et al. | |
| 1,468,908 A | 9/1923 | Krafft | |
| 1,477,981 A | 12/1923 | Sechler | |
| 1,505,980 A | 8/1924 | Stolitzka | |
| 1,603,665 A * | 10/1926 | Deane | 220/372 |
| 1,777,743 A | 10/1930 | Blenz | |
| 2,127,988 A | 8/1938 | Tarrant | |
| 2,348,452 A | 5/1944 | Christopher | |
| 2,385,594 A | 9/1945 | Witte, Jr. | |
| 2,636,636 A | 4/1953 | Smith | |
| 2,696,816 A | 12/1954 | Barber et al. | |
| 2,760,672 A | 8/1956 | Cronheim | |
| 2,907,467 A | 10/1959 | Machate, Jr. | |

(Continued)

*Primary Examiner* — Jacob K Ackun
*Assistant Examiner* — Robert J Hicks
(74) *Attorney, Agent, or Firm* — Vidas, Arrett & Steinkraus

(57) ABSTRACT

In some embodiments, a cooking utensil comprises a pot with a lid that divides a cooking chamber in the pot from a condensing chamber above the lid. To prevent boil-over, one or more openings in the lid and/or openings radially between the lid and the pot convey bidirectional flow between the cooking and condensing chambers. Boiling liquid/vapor foam from the cooking chamber flows upward through the opening to the condensing chamber. Upon subsequently flowing across an upper surface of the lid, the liquid/foam condenses and then returns through the opening to the cooking chamber. In some examples, the cookware includes both a mechanical seal and a liquid seal between the lid and the pot. In some embodiments, a single opening in the lid maximizes the lid's condensing surface while still allowing sufficient flow between the cooking and condensing chambers. Such a single opening also makes the cookware easy to clean.

14 Claims, 12 Drawing Sheets

(56) References Cited

U.S. PATENT DOCUMENTS

| | | |
|---|---|---|
| 3,465,745 A | 9/1969 | Butler |
| 3,809,064 A | 5/1974 | Ziegler |
| 4,157,707 A | 6/1979 | Schwind et al. |
| 4,467,784 A | 8/1984 | Lee et al. |
| 4,482,077 A | 11/1984 | Henderson |
| 4,485,801 A | 12/1984 | Hodges et al. |
| 4,828,140 A | 5/1989 | Henderson |
| 4,952,765 A | 8/1990 | Toyosawa |
| 5,033,453 A | 7/1991 | Loyd et al. |
| 5,996,574 A * | 12/1999 | Loyd et al. ............... 126/386.1 |
| 6,105,811 A | 8/2000 | Alfred |
| 2002/0129714 A1* | 9/2002 | Lee et al. ............... 99/403 |
| 2004/0200841 A1* | 10/2004 | Seiple et al. ............... 220/369 |

* cited by examiner

BOIL-TOLERANT COOKWARE

CROSS REFERENCE TO RELATED APPLICATIONS

This application claims the benefit of provisional patent application Ser. No. 61/604,075 filed on Feb. 28, 2012 by the present inventor.

BACKGROUND OF THE INVENTION

The subject invention generally pertains to cookware and more specifically to means for avoiding boil-over in a pot.

The term, "pot" means any reservoir, shallow or deep, adapted to hold a liquid. Examples of a pot include, but are not limited to, a frying pan, vessel, container, slow-cooker, wok, bowl, jar, bucket, pail, etc. Cooking pots are often used for heating fluids usually atop a stove, burner, outdoor grill, campfire, etc. In some cases, such as in a slow-cooker, a pot has its own heat source. In any case, boil-over is a potential problem where fluids boiling in the pot bubble up into a foam of liquid and vapor that overflows the pot, which can create a mess.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a cooking utensil comprises a pot having a pot bottom, a pot rim, a pot sidewall, a cooling flange and an intermediate ledge, wherein the pot sidewall encircles and adjoins the pot bottom, the cooling flange adjoins the pot rim, and the intermediate ledge is interposed between the pot sidewall and the cooling flange. The cooking utensil further comprises a lid that can be set upon the intermediate ledge of the pot. The lid comprises a lid bottom, an outer periphery, a lid rim and a lower edge, wherein the lower edge adjoins the lid bottom, the outer periphery adjoins the lower edge, the lid rim adjoins the outer periphery, the outer periphery is interposed between the lower edge and the lid rim, and the lid bottom has an opening therethrough that places a cooking chamber of the pot in fluid communication with a condensing chamber of above the lid. A condensing portion of the lid adjoining and encircling the opening is less thermally conductive than the pot bottom.

In some embodiments, the lid comprises a lid flange extending from the lower edge of the rim to the lid rim, and an annular gap is defined by the outer periphery of the lid and the cooling flange. The annular gap provides an average radial clearance between the cooling flange and the outer periphery of the lid. The lid flange has a height (certain axial distance) that is at least three times greater than the material radial thickness of the lid flange and at least ten times greater than the average radial clearance between the cooling flange and the outer periphery of the lid.

In some embodiments, the cooking utensil comprises a pot with a cooking chamber, a lid with a first condensing chamber, and a second condensing chamber radially interposed between the lid and the pot.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

FIGS. 1-16 illustrate example boil-tolerant cookware (cooking utensils) and various portions, features, methods and their variations. To avoid boil-over, such cooking utensils include novel lid and pot arrangements.

Figure 1:
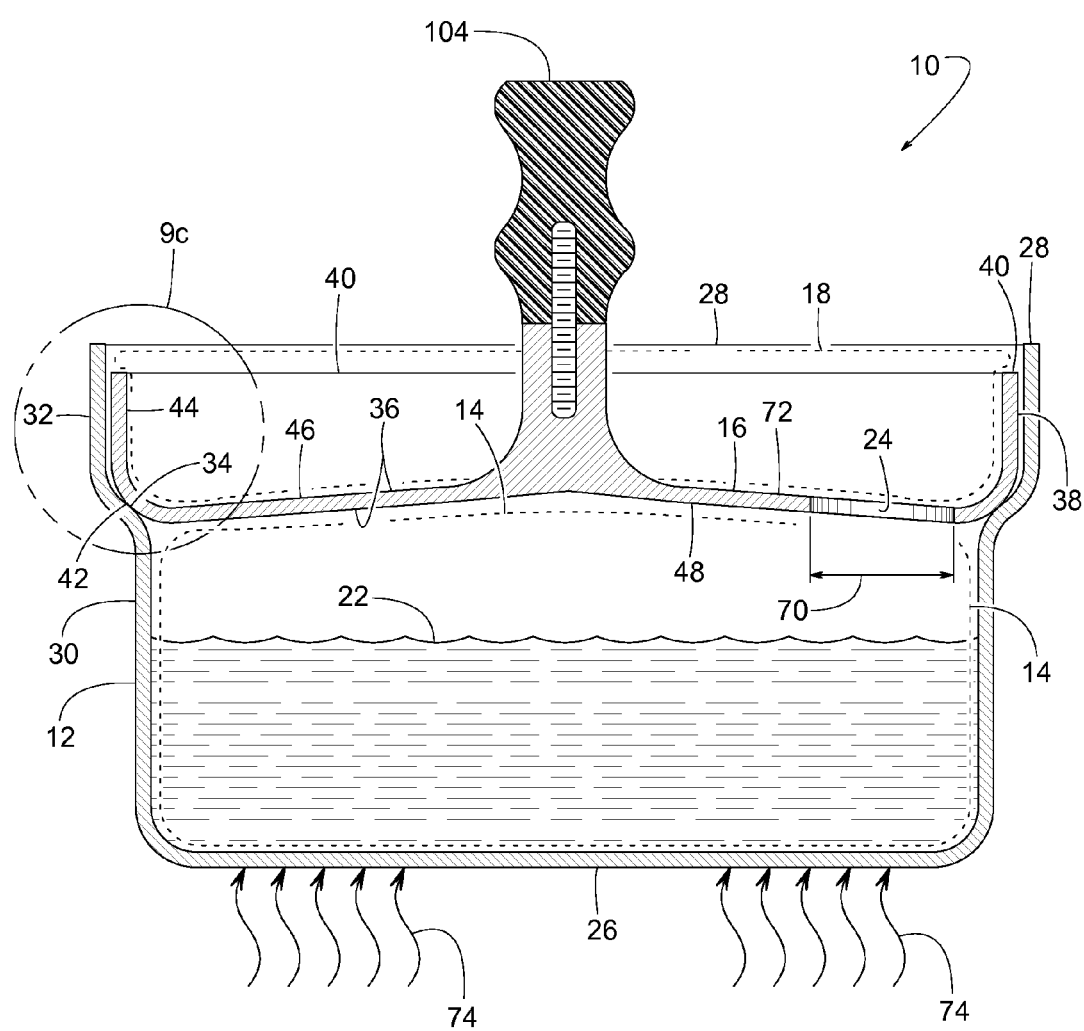
FIG. 1 is a cross-sectional side view of a cooking utensil according to one example embodiment wherein a lid is resting on a pot.
Figure 2:
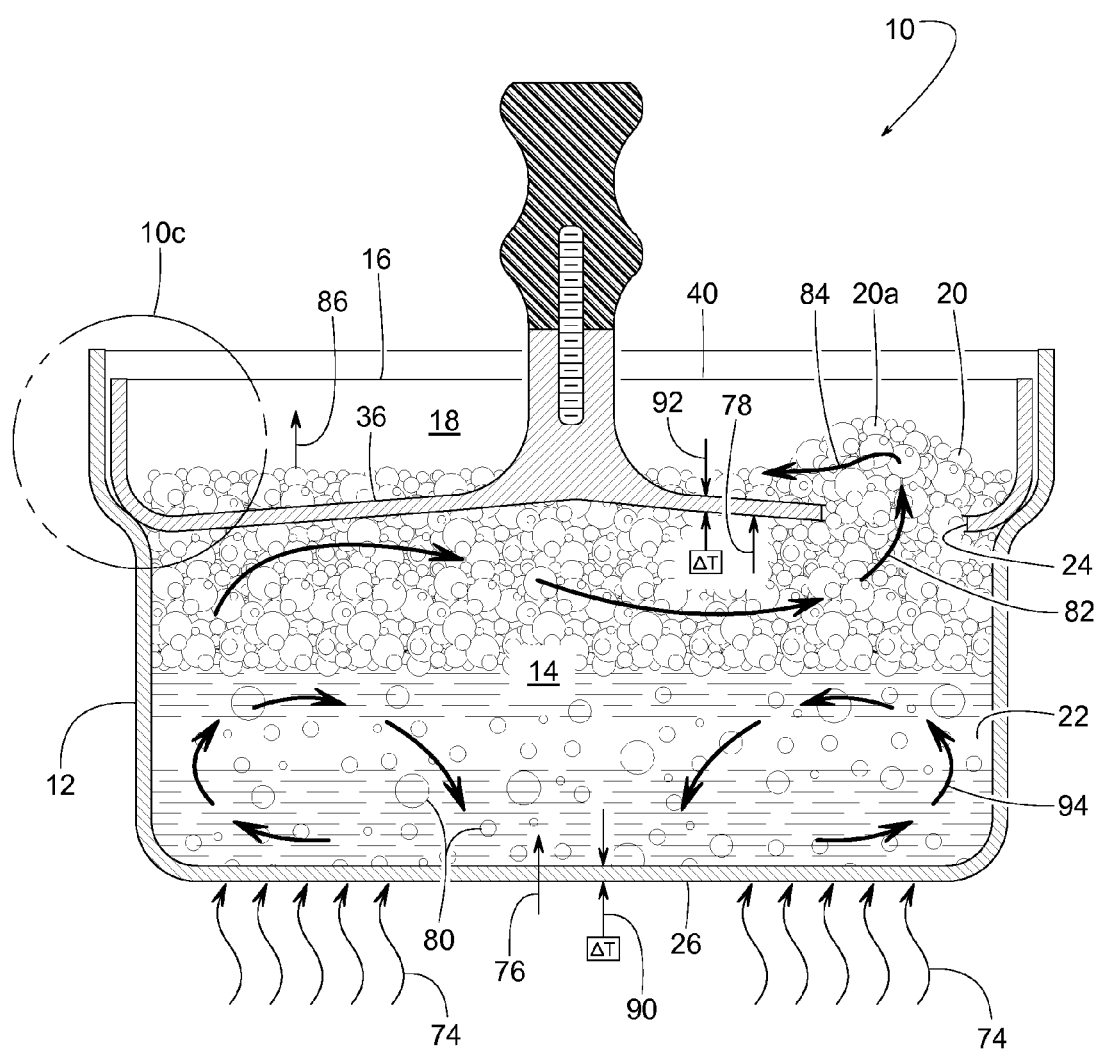
FIG. 2 is a cross-sectional side view similar to FIG. 1 but showing boiling liquid in the pot and a foam mixture of liquid and vapor on the lid.
Figure 3:
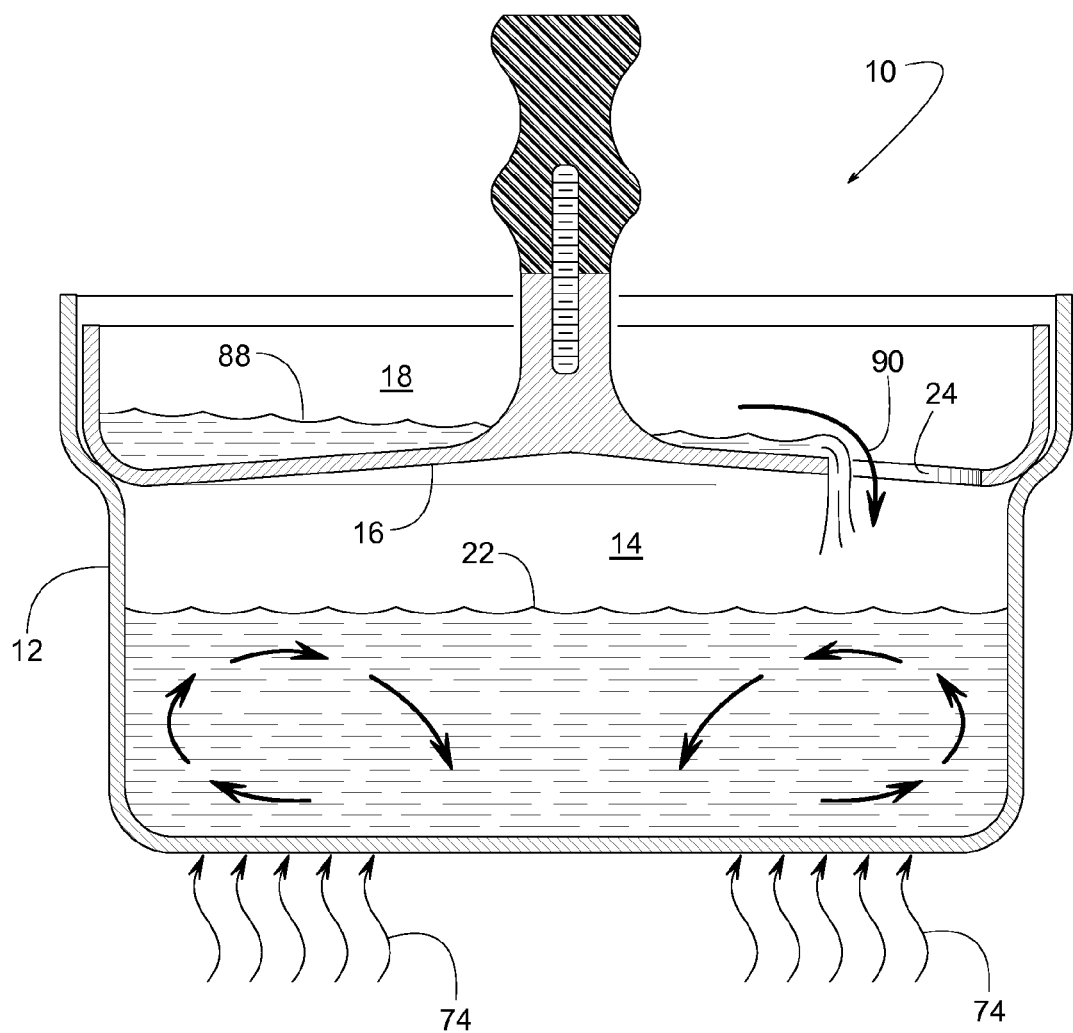
FIG. 3 is a cross-sectional side view similar to FIG. 2 but showing the foam mixture having condensed and draining back into a cooking chamber of the pot.

FIGS. 1-4, for example, show a cooking utensil 10 comprising a pot 12 with a cooking chamber 14 and a lid 16 with a condensing chamber 18. To handle a foam mixture 20 of liquid and vapor generated by boiling a liquid fluid 22 (e.g., liquid water, soup, stew, etc.) in pot 12, lid 16 has an opening 24 (e.g., a main hole) for conveying foam mixture 20 up from within the pot's cooking chamber 14 to condensing chamber 18, as shown in FIG. 2. In condensing chamber 18, above lid 16, the boiled fluid condenses and then drains back down through opening 24 to return to cooking chamber 14, as shown in FIG. 3. In some examples, there are multiple openings in the lid and/or one or more openings between the lid and the pot for conveying fluid between the cooking and condensing chambers.

Figure 4:
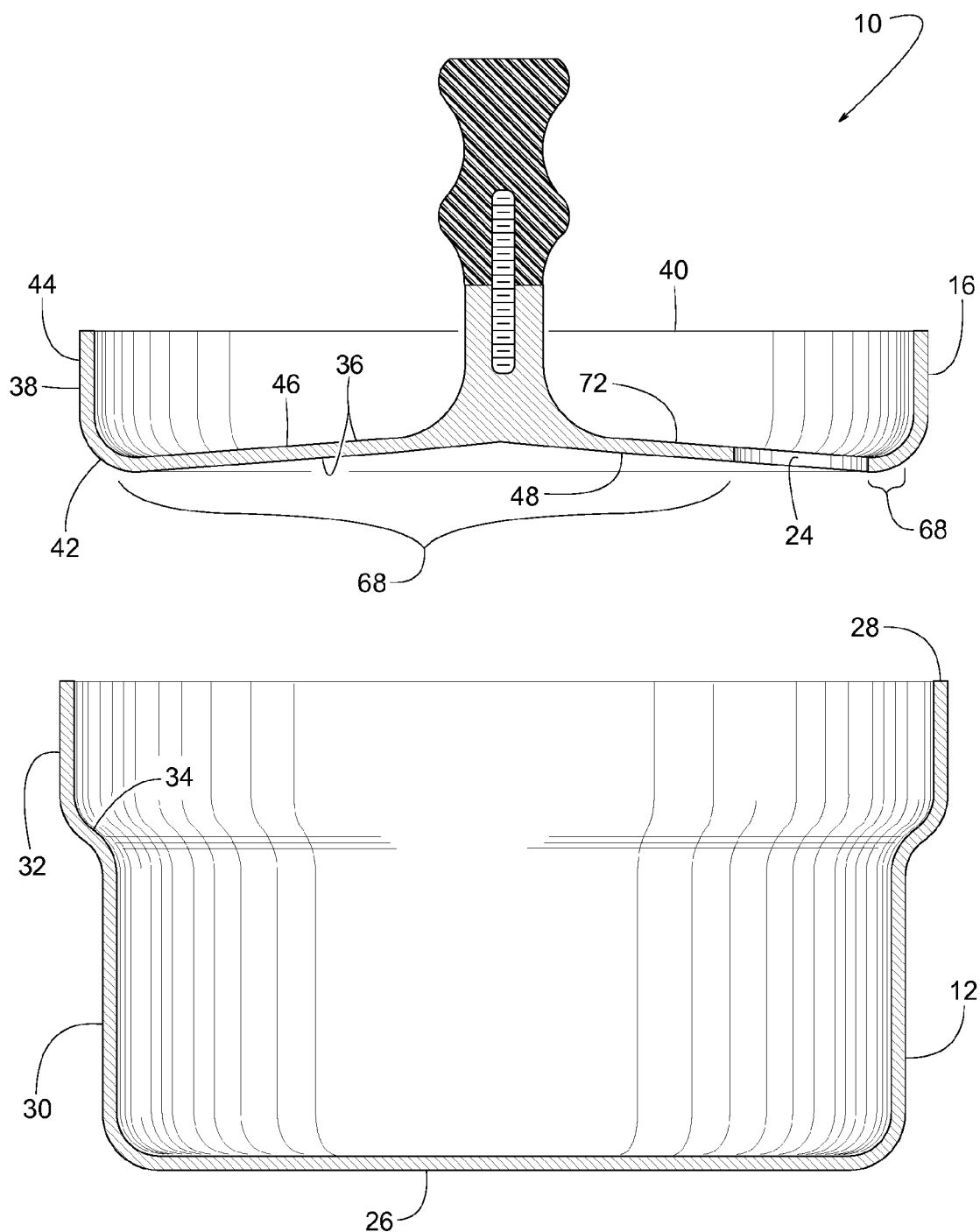
FIG. 4 is a cross-sectional side view similar to FIG. 1 but showing the lid separated from the pot.
Figure 5:
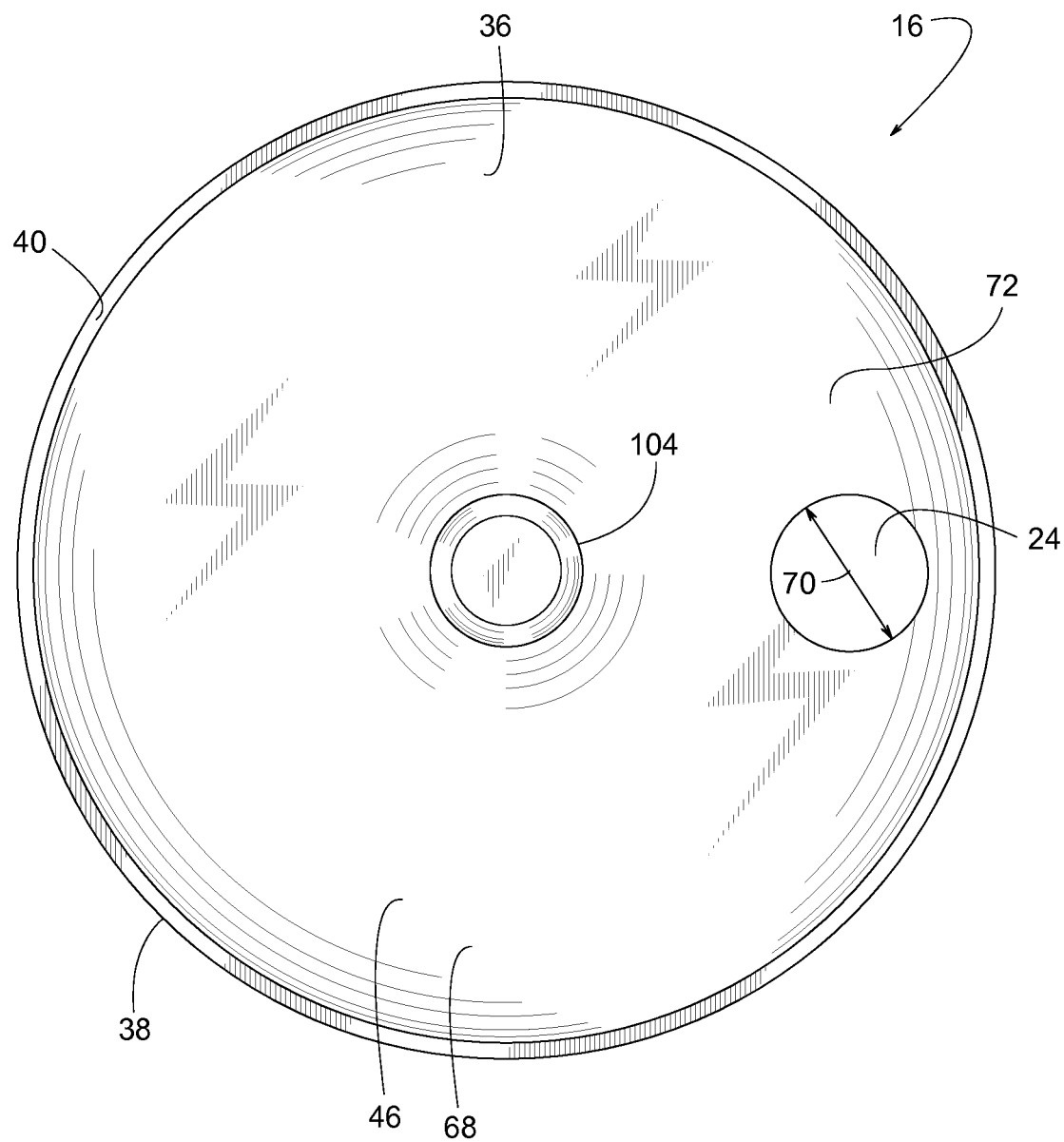
FIG. 5 is a top view of the lid shown in FIG. 1.
Figure 6:
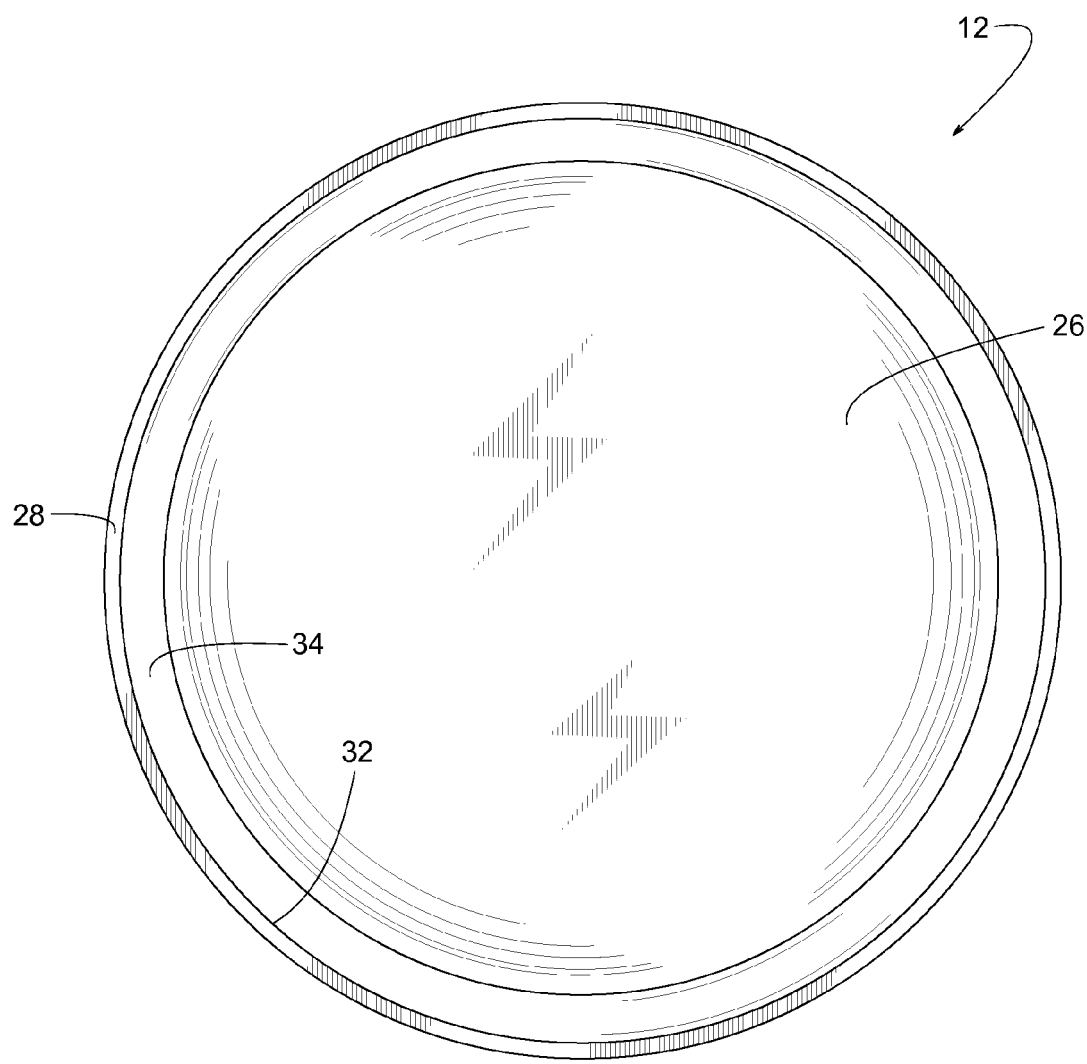
FIG. 6 is a top view of the pot shown in FIG. 1.
Figure 7:
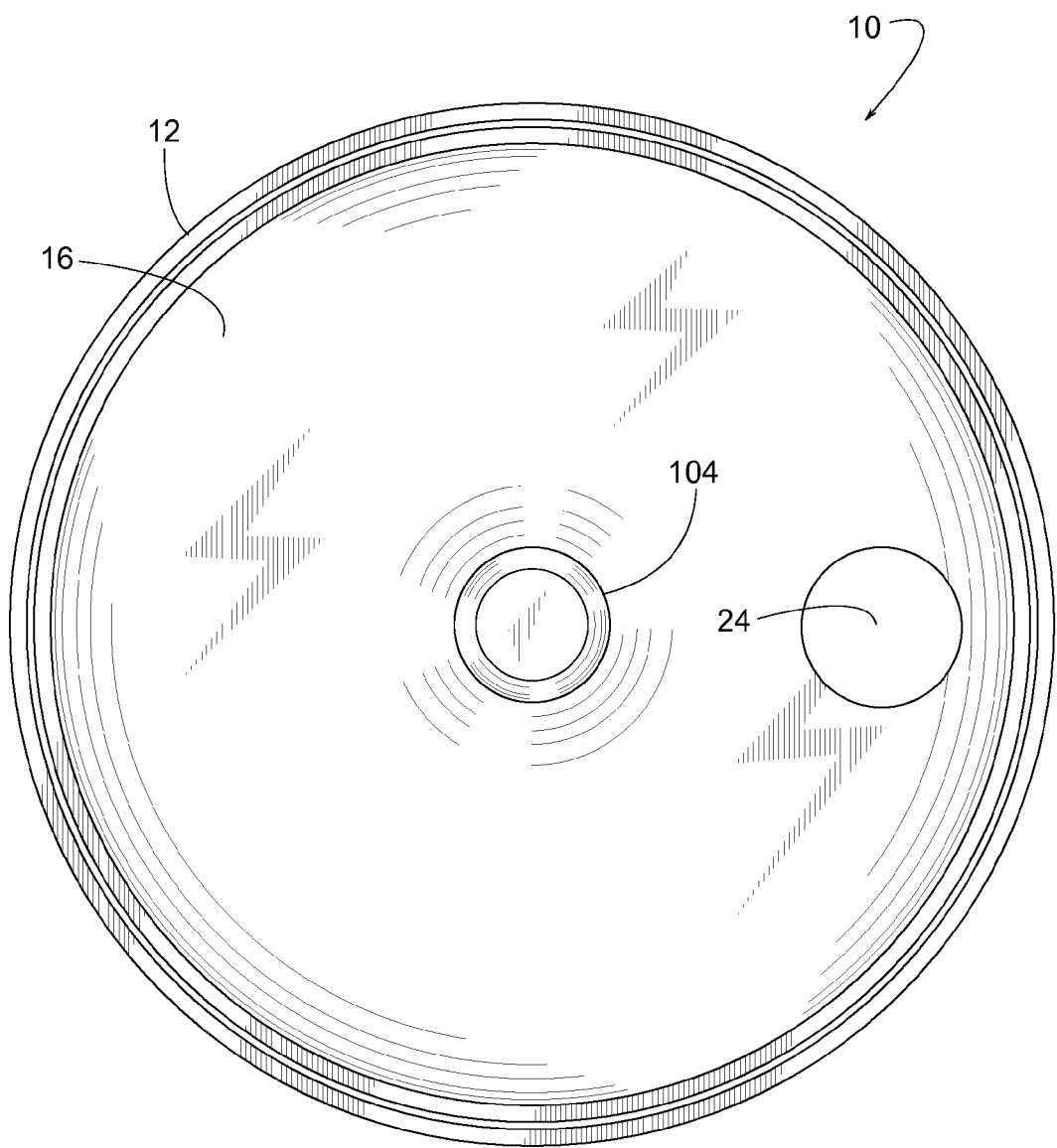
FIG. 7 is a top view of FIG. 1.

Lid 16 is selectively movable between an employed position (FIG. 1) and a removed position (FIG. 4). FIG. 5 shows a top view of lid 16 alone, FIG. 6 shows a top view of pot 12 alone, and FIG. 7 shows a top view of lid 16 on pot 12.

Although the actual structure of pot 12 and lid 16 may vary, the example of cooking utensil 10 has pot 12 comprising a pot bottom 26, a pot rim 28, a pot sidewall 30, a cooling flange 32 and an intermediate ledge 34. Pot sidewall 30 encircles and adjoins pot bottom 26, cooling flange 32 adjoins pot rim 28, and intermediate ledge 34 is interposed vertically between pot sidewall 30 and cooling flange 32. Pot 12 can be made of various heat resistant materials. Examples of such materials include, but are not limited to, aluminum, steel (e.g., stainless steel), iron (e.g., cast iron), brass, copper, glass, ceramic and PYREX (Pyrex being a registered trademark of Corning Incorporated, of Corning, N.Y.). In some examples, pot 12 is a unitary piece of material void of any structural joints (with the exception of perhaps some surface plating or coating).

Figure 8:
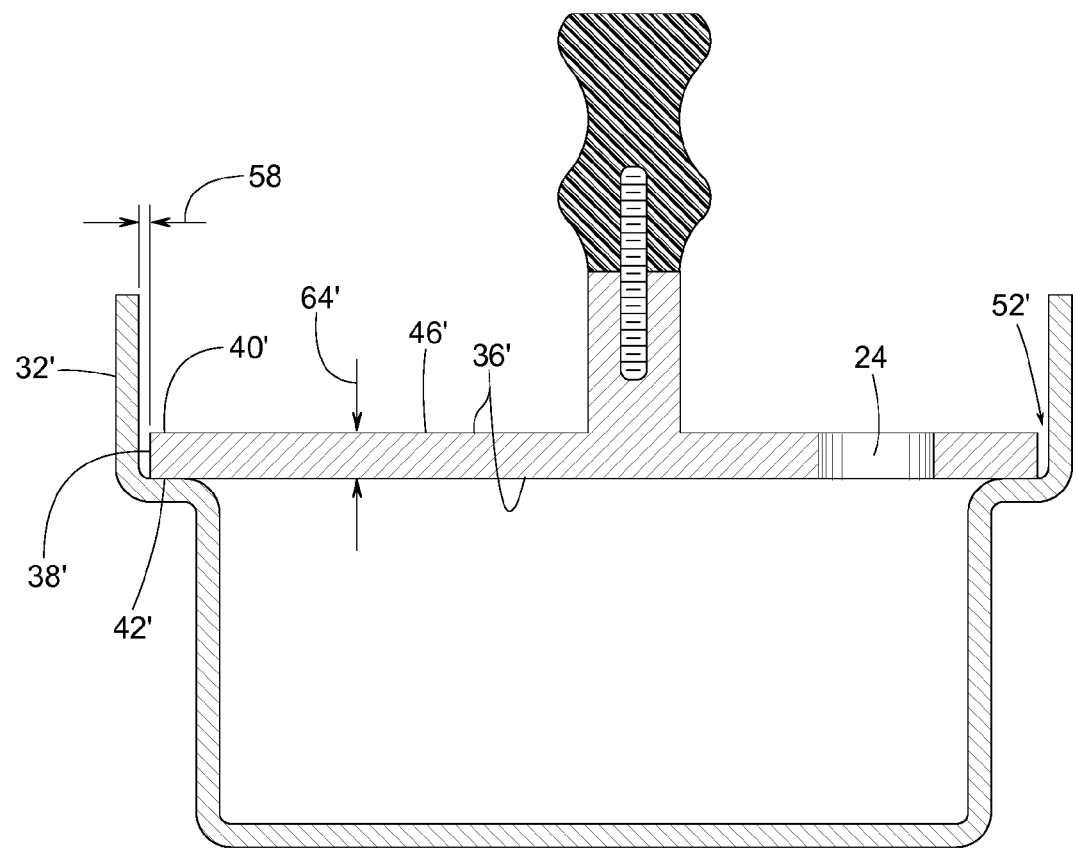
FIG. 8 is a cross-sectional view similar to FIG. 1 but showing an alternate embodiment.
Figure 9:
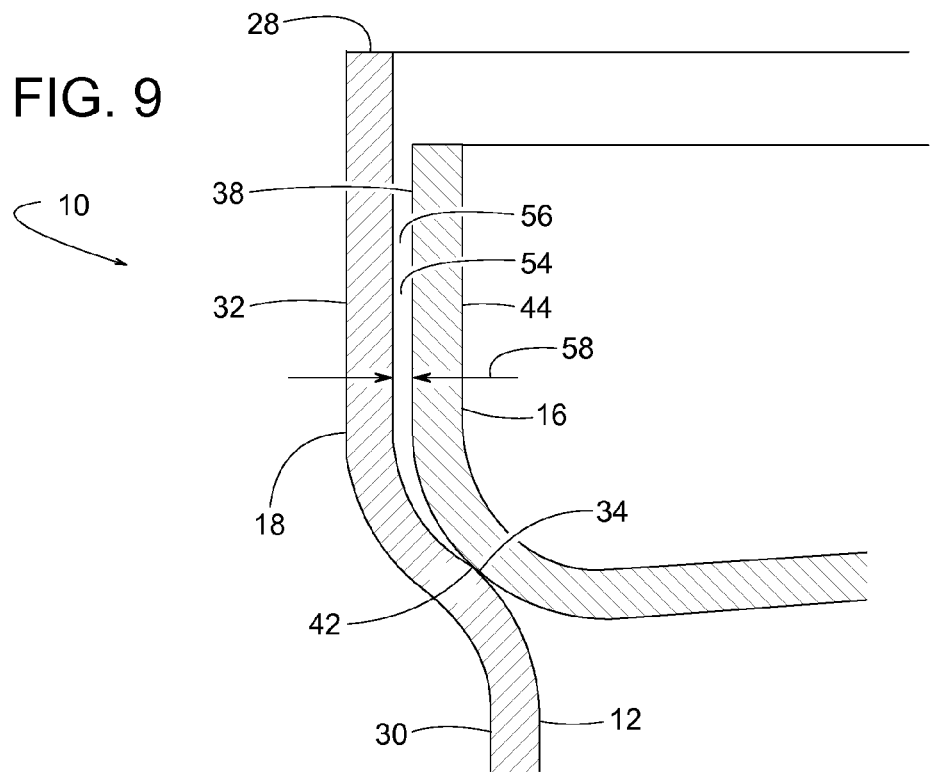
FIG. 9 is an enlarged view identified by circle 9c of FIG. 1.
Figure 10:
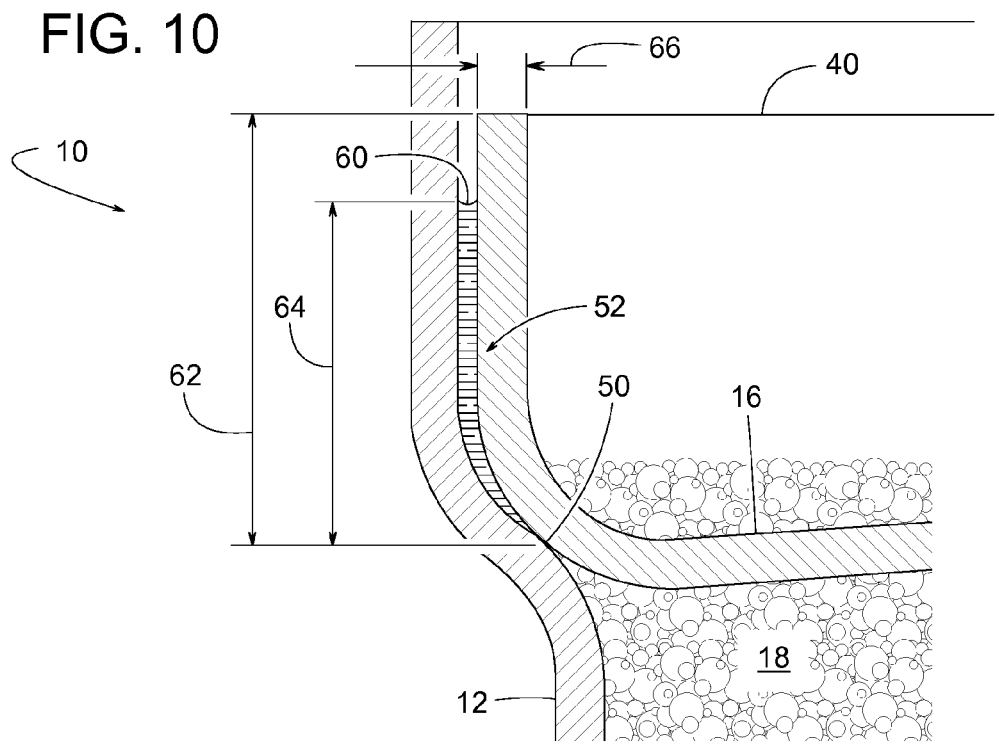
FIG. 10 is an enlarged view identified by circle 10c of FIG. 2.

Also in the example of cooking utensil 10, lid 16 comprises a lid bottom 36, an outer periphery 38, a lid rim 40 and a lower edge 42. The term, "lid bottom" means a structural mass (e.g., a plate) and does not mean just a lower surface of the mass. Opening 24 runs through lid bottom 36, lower edge 42 adjoins lid bottom 36, outer periphery 38 adjoins lower edge 42, and lid rim 40 adjoins outer periphery 38. Thus, outer periphery 38 extends between lower edge 42 and lid rim 40. Lid rim 40 is the uppermost surface at outer periphery 38. In some examples, the lid rim protrudes upward from the lid bottom to create a lid flange 44, as shown in FIGS. 1 and 4, wherein lid rim 40 is above an upper surface 46 of lid bottom 36. In such an example, lid flange 44 extends from lower edge 42 to lid rim 40, and outer periphery 38 lies on lid flange 44. In other examples, the lid rim is flush with the lid bottom, as shown in FIG. 8, wherein a lid rim 40' is generally coplanar with an upper surface 46' of a lid bottom 36'. In the example of FIG. 8, an outer periphery 38' extends between lid rim 40' and a lower edge 42'. Referring to FIGS. 1 and 9, lower edge 42 is a line or point of contact between lid 16 and pot 12 when lid 16 is in its employed position.

Cooking chamber 14 is the volume of space situated axially between pot bottom 26 and a lower surface 48 of lid 16 and limited radially by pot sidewall 30. Condensing chamber 18 is the volume of space below pot rim 28 and above upper surface 46 of lid bottom 36. Condensing chamber 18 is limited in the radial direction by cooling flange 32 and/or lid flange 44 of lid 16. In the example of FIG. 1, the upper portion of condensing chamber 18 extends radially to the pot's cooling flange 32, and the lower portion of condensing chamber 18 extends radially to lid flange 44.

To prevent boiling fluid from flowing upward along the full vertical length of the pot's inner surface (i.e., flowing up from pot sidewall 30 directly to cooling flange 32 and ultimately over pot rim 28), cooking utensil 10 includes both a mechanical abutting seal 50 and a liquid seal 52 in the area where lid 16 is generally adjacent to pot 12 (at intermediate ledge 34). Mechanical seal 50 is provided by a substantially continuous circular line of contact where the lid's lower edge 42 engages the pot's intermediate ledge 34. In the example of FIG. 1, the circular line of contact is between inclined surfaces of edge 42 and ledge 34. Such inclined surfaces at the line of contact help radially center lid 16 to pot 12 to provide a substantially uniform annular gap 56 between the two.

Liquid seal 52 can be relied upon in the event boiling fluid breaches mechanical seal 50, which might happen if a lodged food particle or lid warpage creates an area of separation between lower edge 42 and intermediate ledge 34. Liquid seal 52 is created by boiling fluid condensing within a secondary condensing chamber 54. In some examples, secondary condensing chamber 54 is the annular gap 56, which has an average radial clearance 58 (less than 1.6 mm) between the pot's cooling flange 32 and the lid's outer periphery 38. Annular gap 56 of secondary condensing chamber 54 is substantially concentric with condensing chamber 18 (the main condensing chamber). The pot's cooling flange 32 and/or lid flange 44, in some examples, act as cylindrical heat transfer fins that draw heat from the fluid in condensing chamber 54 and releases the heat to the surrounding air, whereby the fluid condenses to a liquid 60 in liquid seal 52. The condensed liquid 60 provides a pressure head 62 that alone or in combination with liquid adhesion inhibits additional boiling fluid from flowing upward through and beyond a breached mechanical seal 50.

It has been found, in some examples, that in order to create an effective liquid seal by virtue of rapid condensation due to ample heat transfer through flange 32 and/or 44, lid flange 44 has a height 64 (certain axial distance) of at least three times greater than the lid's material radial thickness 66, wherein height 64 is defined as being the axial distance between lid rim 40 and lower edge 42. In some examples, an effective liquid seal by virtue of rapid condensation due to ample heat transfer through flange 32 and/or 44 plus sufficient pressure head 62 achieved by having flange height 64 be at least ten times greater than average radial clearance 58 between cooling flange 32 and outer periphery 38. Likewise, in the example of FIG. 8, an effective liquid seal 52' is achieved by having the lid's height 64' (certain axial distance) be at least three times greater than an average radial clearance 58' between a cooling flange 32' and outer periphery 38'.

In some examples, if boiling liquid manages to flow upward through and past both seals 50 and 52, the resulting fluid discharging up from between flanges 32 and 44 is directed radially inward into condensing chamber 18 due to pot rim 28 (pot rim 28' in the example of FIG. 8) being appreciably higher than lid rim 40 (lid rim 40' in the example of FIG. 8).

In some examples of cooking utensil 10, opening 24 in lid 16 is a single hole through lid bottom 36, and an entire remaining portion 68 of lid bottom 36 beyond the single opening 24 is impervious to fluid flow. This maximizes the surface area of the lid's impervious portion 68 and thus maximizes the heat transfer area for condensing foam mixture 20. To ensure opening 24 (as a single hole) is of sufficient size to handle the volume of flow of foam mixture 20 without unnecessarily sacrificing the surface area of the lid's impervious portion 68, some examples of cooking utensil 10 is such that the volume of cooking chamber 14 divided by a hole diameter 70 of single opening 24 provides a ratio of between 100 to 300 square centimeters.

In some examples, opening 24 (in the embodiment of a single hole) is nonconcentric with the lid's outer periphery 38. Such a radially asymmetrical arrangement enhances condensation by providing a longer and more convoluted or disruptive flow pattern for foam mixture 20 as the foam travels across both the upper and lower surfaces of lid 16.

In some examples, lid bottom 36 (i.e., at least a condensing portion 72 adjoining and encircling opening 24) has a lower thermal conductivity than that of pot sidewall 30. The lid's lower conductivity resists heat conducted upward through lid bottom 36. This reduces the temperature of the lid's upper surface 46, and thus increases the rate at which foam mixture 20 condenses above lid 16. To achieve such relatively low thermal conductivity, some example materials of lid bottom 36 include, but are not limited to, glass, ceramic and PYREX. In some examples, lid bottom 36 comprises multiple sheet layers separated by air, vacuum, insulation or some other material or fluid having low thermal conductivity.

A cooking utensil method of cooking utensil 10 is illustrated in FIGS. 1-3 and 11. Supporting fluid 22 within cooking chamber 14, wherein fluid 22 in cooking chamber 14 is sometimes in a liquid state is illustrated in FIGS. 1-3 and 11 (all four drawing figures show pot 12 supporting fluid 22 in a liquid state). Arrows 74 schematically represents a heat source (e.g., a stove, burner, outdoor grill, campfire, pot's own heat source, etc.), and an arrow 76 represents transferring heat up through pot bottom 26 at a first rate. An arrow 78 represents transferring heat upward through lid bottom 36 at a second rate. Bubbles 80 represent boiling fluid 22 in cooking chamber 14, thereby creating foam mixture 20 of liquid and vapor. An arrow 82 (upward flow 82 or upward flow pattern) represents forcing a portion 20a of foam mixture 20 from cooking chamber 14 to condensing chamber 18, wherein most of portion 20a flows up through opening 24 (e.g., main hole), thus creating upward flow 82 through opening 24. An arrow 84 represents conveying portion 20a of foam mixture 20 over lid bottom 36 away from opening 24. An arrow 86 represents transferring heat at a third rate away from portion 20a of foam mixture 20 on lid bottom 36, wherein the third rate is greater than the second rate, thereby changing portion 20a of foam mixture 20 on lid bottom 36 to a condensate 88 (FIG. 3). An arrow 90 (downward flow 90 or downward flow pattern) represents draining most of condensate 88 from main condensing chamber 18 down through opening 24 and back to cooking chamber 14, thus creating downward flow 90 through opening 24 in addition to the upward flow 82 through opening 24.

In some examples, pot bottom 26 has greater thermal conductivity than that of lid bottom 36, and the first heat transfer rate 76 is greater than the second heat transfer rate 78 partially due to pot bottom 26 having greater thermal conductivity than lid bottom 36. Arrow 90 schematically represents creating a first temperature differential up through pot bottom 26, and arrow 92 represents creating a second temperature differential up through lid bottom 36. In some examples, the first temperature differential 90 is greater than the second temperature differential 92 to ensure heat source 74 does not overwhelm the condensing chamber's ability to condense foam mixture 20a.

Figure 11:
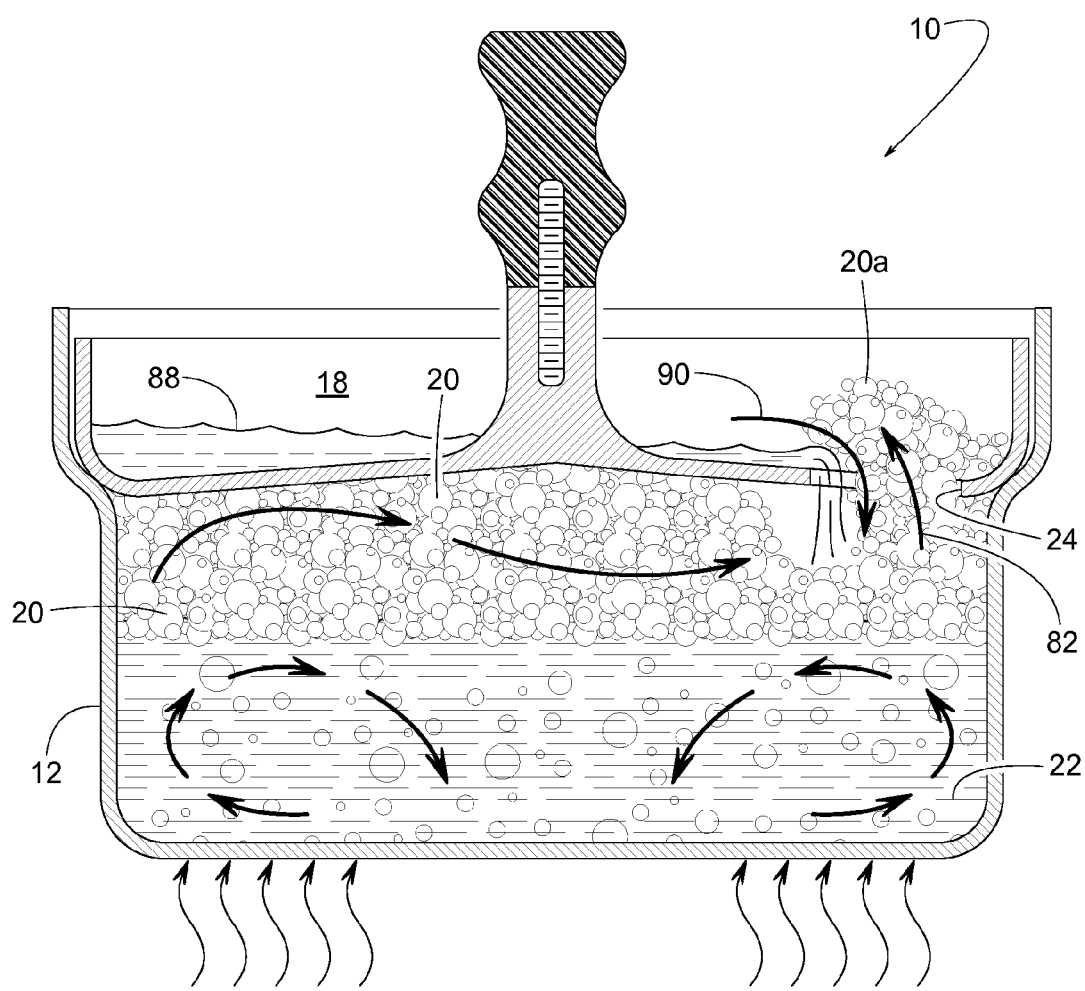
FIG. 11 is a cross-sectional view similar to FIGS. 2 and 3 but showing another fluid flow pattern.

Depending on the operating conditions, upward flow 82 and downward flow 90 through opening 24 sometimes happen consecutively (as shown in FIGS. 2 and 3) and sometimes happen concurrently (as shown in FIG. 11). In examples where opening 24 is radially offset or nonconcentric with the rest of pot 12 and lid 16, such an offset position directs the upward and downward flow patterns 82 and 90 to where they disrupt a toroidal convection current 94 of fluid 22 boiling within cooking chamber 14, wherein current 94 can be caused by heat source 74 being greater near the pot's outer periphery. In some cases, it appears that flow patterns 82 and/or 90 being off center provides a virtual stirring effect that seems to calm the boiling process. In cases where upward and downward flow patterns 82 and 90 happen concurrently, as shown in FIG. 11, the simultaneous flow patterns are in heat transfer relationship with each other, which hastens the condensation of foam mixture 20a.

Figure 12:
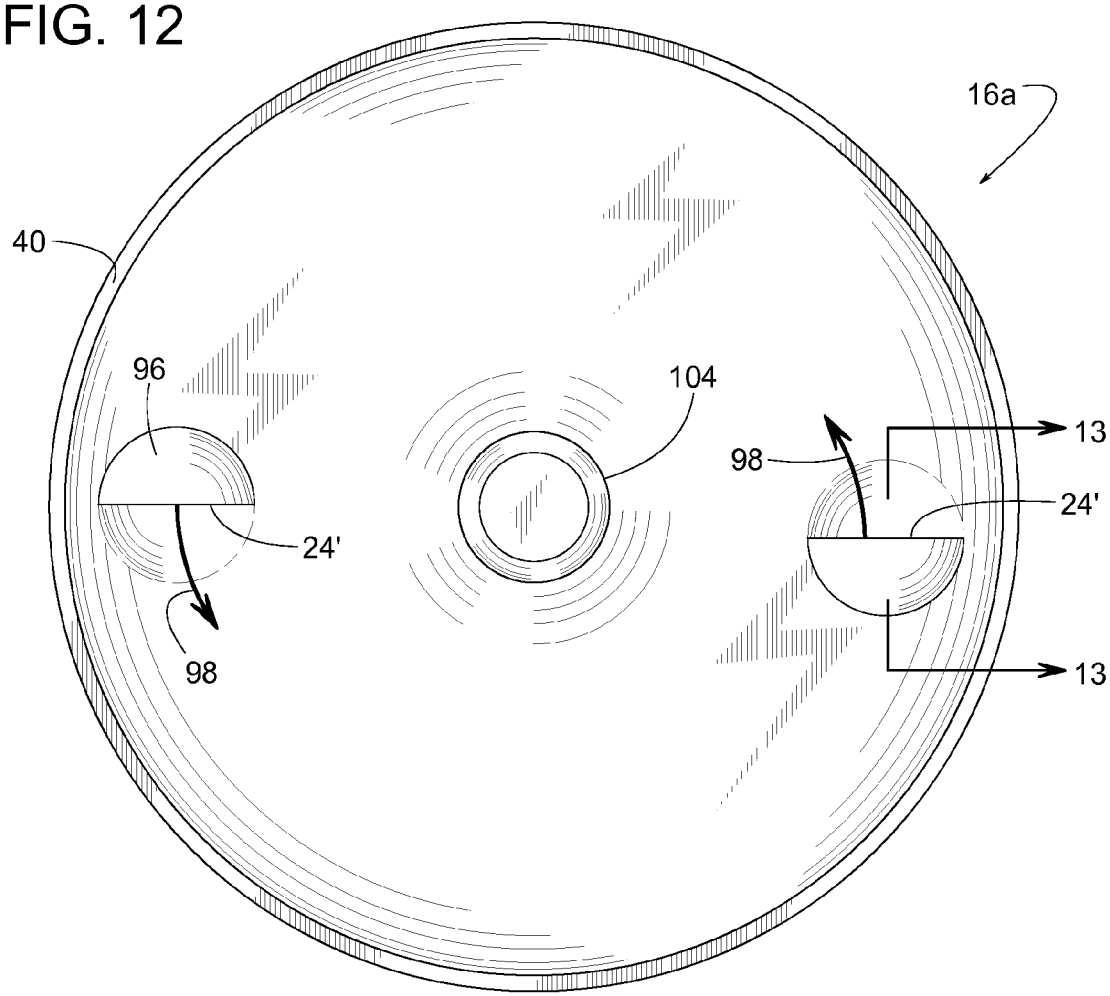
FIG. 12 is a top view of another example lid embodiment.
Figure 13:
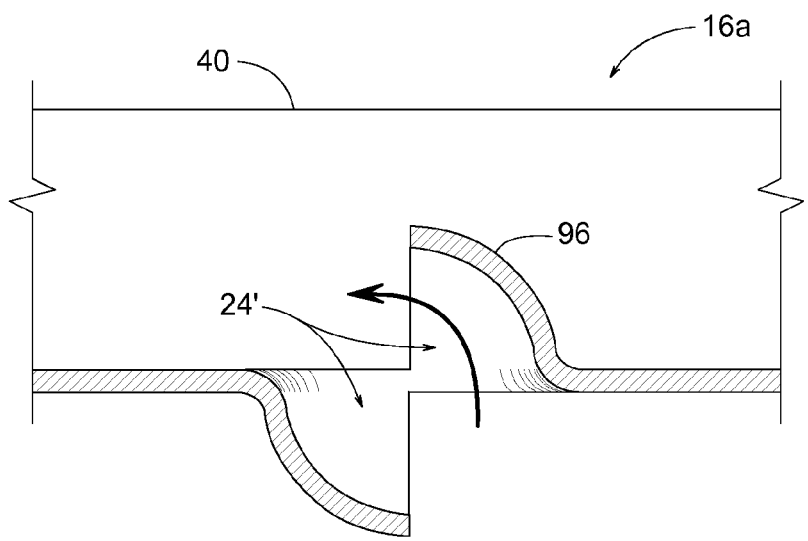
FIG. 13 is a cross-sectional view taken along line 13-13 of FIG. 12.
Figure 14:
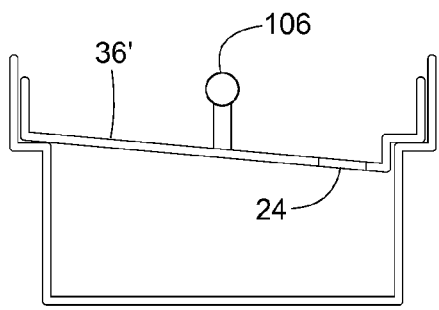
FIG. 14 is a schematic cross-sectional view similar to FIG. 1 but showing a lid with an inclined bottom.
Figure 15:
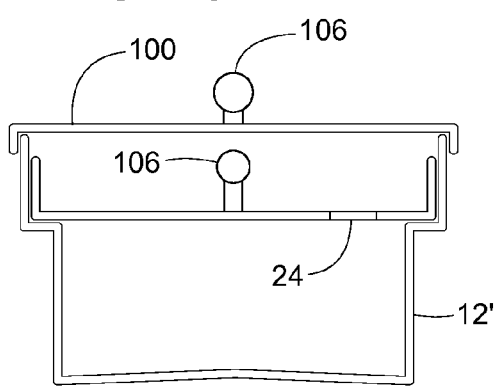
FIG. 15 is a schematic cross-sectional view similar to FIGS. 1 and 14 but showing an additional lid resting upon the pot.
Figure 16:
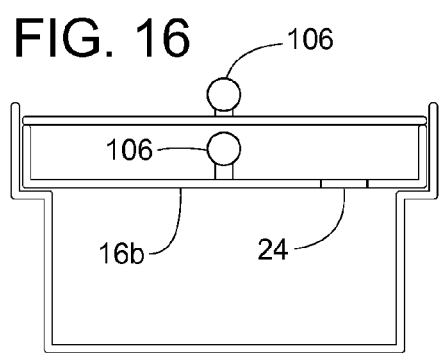
FIG. 16 is a schematic cross-sectional view similar to FIGS. 1 and 15 but showing an additional lid resting upon the lid.
Figure 17:
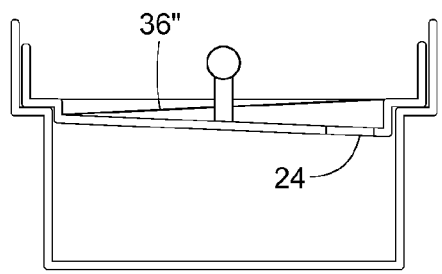
FIG. 17 is a schematic cross-sectional view similar to FIGS. 1 and 14 but showing a lid with a helically inclined surface, wherein condensate flows generally 360 degrees around the lid.
Figure 18:
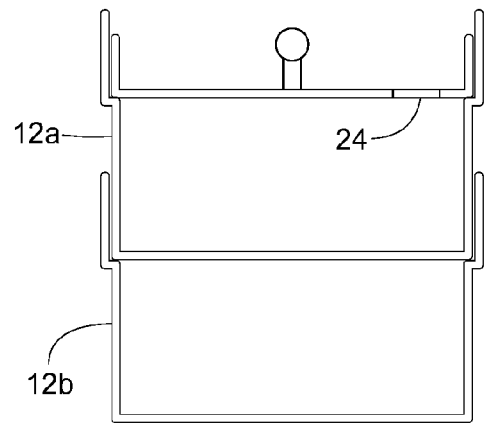
FIG. 18 is a schematic cross-sectional view showing an embodiment of a double-boiler.

To further enhance the condensation process and/or to deflect vertical spray of fluid 22 (e.g., foam 20), an example lid 16a, shown in FIGS. 12 and 13, includes one or more openings 24' each with a baffle 96 that directs fluid (i.e., foam 20a) in a more circumferential direction 98. Additional enhancements or variations are schematically illustrated in FIGS. 14-18. FIG. 14 show an inclined lid bottom 36' to promote condensate drainage, FIG. 15 shows an outer lid 100 overlying a pot 12' with a bottom that bows slightly upward for stability on a burner, FIG. 16 shows an outer lid 102 overlying an inner lid 16b, FIG. 17 shows a helically inclined lid bottom 36", and FIG. 18 shows separable pots 12a and 12b nested to provide a double boiler, wherein pot 12b in some examples has a perforated bottom. Items 104 (FIG. 1) and 106 (FIGS. 14-16) are handles.

In some embodiments, a cooking utensil 10 can be described according to the following numbered clauses: (1) A cooking utensil comprising: a pot having a pot bottom, a pot rim, a pot sidewall, a cooling flange and an intermediate ledge, the pot sidewall encircling and adjoining the pot bottom, the cooling flange adjoining the pot rim, the intermediate ledge being interposed between the pot sidewall and the cooling flange; a lid having a lid bottom, an outer periphery, a lid rim and a lower edge, the lower edge adjoining the lid bottom, the outer periphery adjoining the lower edge, the lid rim adjoining the outer periphery, the outer periphery being interposed between the lower edge and the lid rim, the lower edge and the lid rim being spaced apart by a certain axial dimension, the lid bottom defining an opening therethrough, the lid being selectively movable to a removed position and an employed position, the lid being spaced apart from the pot when the lid is in the removed position, the lid in the employed position is such that: the lower edge of the lid rests upon the intermediate ledge of the pot; the lid rim is lower than the pot rim; a cooking chamber is defined by the lid bottom, the pot bottom and the pot sidewall; a condensing chamber is defined axially by the pot rim and the lid bottom and is defined radially by at least one of the lid and the cooling flange; and the opening places the cooking chamber in open fluid communication with the condensing chamber; and a condensing portion of the lid adjoining and encircling the opening, the condensing portion of the lid being part of the lid bottom, the condensing portion of the lid being less thermally conductive than the pot bottom. —(2) The cooking utensil of clause 1, wherein the opening in the lid is a single hole through the lid bottom, and an entire remaining portion of the lid bottom beyond the single hole is impervious to fluid flow. —(3) The cooking utensil of clause 1, wherein the single hole is nonconcentric with the outer periphery of the lid. —(4) The cooking utensil of clause 1, wherein the single hole has a hole diameter, the cooking chamber has a cooking chamber volume, and a ratio of the cooking chamber volume divided by the hole diameter is within a range of 100 to 300 square centimeters. —(5) The cooking utensil of clause 1, wherein the lid includes a lid flange extending from the lower edge of the rim to the lid rim, the outer periphery of the lid being on the lid flange, an annular gap defined by the outer periphery of the lid and the cooling flange, the annular gap providing an average radial clearance between the cooling flange and the outer periphery, the annular gap being substantially concentric with the condensing chamber, the lid flange having a material radial thickness, the certain axial dimension between the lid rim and the lower edge being at least three times greater than the material radial thickness of the lid flange, the certain axial dimension between the lid rim and the lower edge of the lid being at least ten times greater than the average radial clearance between the cooling flange and the outer periphery of the lid. —(6) The cooking utensil of clause 5, wherein the average radial clearance between the cooling flange and the outer periphery of the lid is less than 1.6 millimeters. —(7) A cooking utensil comprising: a pot having a pot bottom, a pot rim, a pot sidewall, a cooling flange and an intermediate ledge, the pot sidewall encircling and adjoining the pot bottom, the cooling flange adjoining the pot rim, the intermediate ledge being interposed between the pot sidewall and the cooling flange; and a lid having a lid bottom, an outer periphery, a lid rim and a lower edge, the lower edge encircling the lid bottom, the outer periphery adjoining the lower edge, the lid rim adjoining the outer periphery, the outer periphery being interposed between the lower edge and the lid rim, the lower edge and the lid rim being spaced apart by a certain axial dimension, the lid defining an opening therethrough, the lid being selectively movable to a removed position and an employed position, the lid being spaced apart from the pot when the lid is in the removed position, the lid in the employed position is such that: the lower edge of the lid rests upon the intermediate ledge of the pot, thereby creating a mechanically abutting seal between the lower edge and the intermediate ledge; the lid rim is lower than the pot rim; a cooking chamber is defined by the lid bottom, the pot bottom and the pot sidewall; a first condensing chamber is defined axially by the pot rim and the lid bottom and is defined radially by at least one of the lid and the cooling flange; a second condensing chamber is defined by an annular gap between the cooling flange of the pot and the outer periphery of the lid, the annular gap providing an average radial clearance between the cooling flange and the outer periphery, the second condensing chamber is substantially concentric with the first condensing chamber, the second condensing chamber provides an annular fluid seal above the mechanically abutting seal; the opening places the cooking chamber in open fluid communication with the first condensing chamber; and the certain axial dimension between the lid rim and the lower edge of the lid is at least three times greater than the average radial clearance between the cooling flange and the outer periphery of the lid. —(8) The cooking utensil of clause 7, wherein the first condensing chamber extends radially out to the cooling flange. —(9) The cooking utensil of clause 7, wherein the average radial clearance between the cooling flange and the outer periphery of the lid is less than 1.6 millimeters. —(10) The cooking utensil of clause 7, wherein the lid includes a lid flange extending from the lower edge of the rim to the lid rim, the outer periphery of the lid being on the lid flange, the second condensing chamber being interposed between the lid flange and the cooling flange, the lid flange having a material radial thickness, the certain axial dimension between the lid rim and the lower edge being at least three times greater than the material radial thickness of the lid flange. —(11) The cooking utensil of clause 7, wherein the opening in the lid is a single hole through the lid bottom, and an entire remaining portion of the lid bottom beyond the single hole is impervious to fluid flow. —(12) The cooking utensil of clause 11, wherein the single hole is nonconcentric with the outer periphery of the lid. —(13) The cooking utensil of clause 11, wherein the single hole has a hole diameter, the cooking chamber has a cooking chamber volume, and a ratio of the cooking chamber volume divided by the hole diameter is 100 to 300 square centimeters. —(14) The cooking utensil of clause 1, wherein the lid bottom has a lower thermal conductivity than that of the pot sidewall.

In some embodiments, a cooking utensil method associated with cooking utensil 10 can be described according to the following numbered clauses: —(15) A cooking utensil method using a pot and a lid, wherein the pot includes a pot bottom, a pot rim, a pot sidewall, a cooling flange and an intermediate ledge, the pot sidewall encircling and adjoining the pot bottom, the cooling flange adjoining the pot rim, the intermediate ledge being interposed between the pot sidewall and the cooling flange, and the lid includes a lid bottom, an outer periphery, a lid rim and a lower edge, the lower edge adjoining the lid bottom, the outer periphery adjoining the lower edge, the lid rim adjoining the outer periphery, the outer periphery being interposed between the lower edge and the lid rim, the lower edge and the lid rim being spaced apart by a certain axial dimension, the cooking utensil method comprising: the lid bottom defining a main hole therethrough; the lid bottom and the pot bottom defining a cooking chamber therebetween; supporting a fluid within the cooking chamber, the fluid in the cooking chamber being sometimes in a liquid state; the pot rim and the lid bottom defining an axial dimension of a main condensing chamber above the lid bottom; at least one of the lid and the cooling flange defining a radial dimension of the main condensing chamber, thus the pot rim, the lid bottom, and at least one of the lid and the cooling flange together define the main condensing chamber; transferring heat up through the pot bottom at a first rate; transferring heat upward through the lid bottom at a second rate; boiling the fluid in the cooking chamber, thereby creating a foam mixture of liquid and vapor; forcing a portion of the foam mixture from the cooking chamber to the condensing chamber, wherein most of the portion flows up through the main hole, thus creating an upward flow through the main hole; conveying the portion of the foam mixture over the lid bottom away from the main hole; transferring heat at a third rate away from the portion of foam mixture on the lid bottom, the third rate being greater than the second rate, thereby changing the portion of foam mixture on the lid bottom to a condensate, and draining most of the condensate from the main condensing chamber down through the main hole and back into the cooking chamber, thus creating a downward flow through the main hole in addition to the upward flow through the main hole. —(16) The cooking utensil method of clause 15, wherein pot bottom has greater thermal conductivity than the lid bottom, and the first rate is greater than the second rate partially due to the pot bottom having greater thermal conductivity than the lid bottom. —(17) The cooking utensil method of clause 15, further comprising: creating a first temperature differential up through the pot bottom; and creating a second temperature differential up through the lid bottom, the first temperature differential being greater than the second temperature differential. —(18) The cooking utensil method of clause 15, wherein the upward flow and the downward flow through the main hole sometimes happen concurrently and sometimes happen consecutively. —(19) The cooking utensil of clause 15, wherein the main hole is a single hole through the lid bottom, and an entire remaining portion of the lid bottom beyond the single hole is impervious to fluid flow. —(20) The cooking utensil of clause 19, wherein the main hole is nonconcentric with the outer periphery of the lid.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A cooking utensil comprising:
   a pot having a pot bottom, a pot rim, a pot sidewall, a cooling flange and an intermediate ledge, the pot sidewall encircling and adjoining the pot bottom, the cooling flange adjoining the pot rim, the intermediate ledge being interposed between the pot sidewall and the cooling flange;
   a lid having a lid bottom, an outer periphery, a lid rim and a lower edge, the lower edge adjoining the lid bottom, the outer periphery adjoining the lower edge, the lid rim adjoining the outer periphery, the outer periphery being interposed between the lower edge and the lid rim, the lower edge and the lid rim being spaced apart by a certain axial dimension, the lid bottom defining an opening therethrough, the lid being selectively movable to a removed position and an employed position, the lid being spaced apart from the pot when the lid is in the removed position, the lid in the employed position is such that:
   a) the lower edge of the lid rests upon the intermediate ledge of the pot;
   b) the lid rim is lower than the pot rim;
   c) a cooking chamber is defined by the lid bottom, the pot bottom and the pot sidewall;
   d) a condensing chamber is defined axially by the pot rim and the lid bottom and is defined radially by at least one of the lid and the cooling flange; and
   e) the opening places the cooking chamber in open fluid communication with the condensing chamber; and
   a condensing portion of the lid adjoining and encircling the opening, the condensing portion of the lid being part of the lid bottom, the condensing portion of the lid being less thermally conductive than the pot bottom;
   wherein the lid includes a lid flange extending from the lower edge of the rim to the lid rim, the outer periphery of the lid being on the lid flange, an annular gap defined by the outer periphery of the lid and the cooling flange, the annular gap providing an average radial clearance between the cooling flange and the outer periphery.

2. The cooking utensil of claim 1, wherein the opening in the lid is a single hole through the lid bottom, and an entire remaining portion of the lid bottom beyond the single hole is impervious to fluid flow.

3. The cooking utensil of claim 1, wherein the single hole is nonconcentric with the outer periphery of the lid.

4. The cooking utensil of claim 2, wherein the single hole has a hole diameter, the cooking chamber has a cooking chamber volume, and a ratio of the cooking chamber volume divided by the hole diameter is within a range of 100 to 300 square centimeters.

5. The cooking utensil of claim 1, the annular gap being substantially concentric with the condensing chamber, the lid flange having a material radial thickness, the certain axial dimension between the lid rim and the lower edge being at least three times greater than the material radial thickness of the lid flange, the certain axial dimension between the lid rim and the lower edge of the lid being at least ten times greater than the average radial clearance between the cooling flange and the outer periphery of the lid.

6. The cooking utensil of claim 5, wherein the average radial clearance between the cooling flange and the outer periphery of the lid is less than 1.6 millimeters.

7. A cooking utensil comprising:
   a pot having a pot bottom, a pot rim, a pot sidewall, a cooling flange and an intermediate ledge, the pot sidewall encircling and adjoining the pot bottom, the cooling flange adjoining the pot rim, the intermediate ledge being interposed between the pot sidewall and the cooling flange; and
   a lid having a lid bottom, an outer periphery, a lid rim and a lower edge, the lower edge encircling the lid bottom, the outer periphery adjoining the lower edge, the lid rim adjoining the outer periphery, the outer periphery being interposed between the lower edge and the lid rim, the lower edge and the lid rim being spaced apart by a certain axial dimension, the lid defining an opening therethrough, the lid being selectively movable to a removed position and an employed position, the lid being spaced apart from the pot when the lid is in the removed position, the lid in the employed position is such that:
   a) the lower edge of the lid rests upon the intermediate ledge of the pot, thereby creating a mechanically abutting seal between the lower edge and the intermediate ledge;
   b) the lid rim is lower than the pot rim;
   c) a cooking chamber is defined by the lid bottom, the pot bottom and the pot sidewall;
   d) a first condensing chamber is defined axially by the pot rim and the lid bottom and is defined radially by at least one of the lid and the cooling flange;
   e) a second condensing chamber is defined by an annular gap between the cooling flange of the pot and the outer periphery of the lid, the annular gap providing an average radial clearance between the cooling flange and the outer periphery, the second condensing chamber is substantially concentric with the first condensing chamber, the second condensing chamber provides an annular fluid seal above the mechanically abutting seal;
   f) the opening places the cooking chamber in open fluid communication with the first condensing chamber; and
   g) the certain axial dimension between the lid rim and the lower edge of the lid is at least three times greater than the average radial clearance between the cooling flange and the outer periphery of the lid.

8. The cooking utensil of claim 7, wherein the first condensing chamber extends radially out to the cooling flange.

9. The cooking utensil of claim 7, wherein the average radial clearance between the cooling flange and the outer periphery of the lid is less than 1.6 millimeters.

10. The cooking utensil of claim 7, wherein the lid includes a lid flange extending from the lower edge of the rim to the lid rim, the outer periphery of the lid being on the lid flange, the second condensing chamber being interposed between the lid flange and the cooling flange, the lid flange having a material radial thickness, the certain axial dimension between the lid rim and the lower edge being at least three times greater than the material radial thickness of the lid flange.

11. The cooking utensil of claim 7, wherein the opening in the lid is a single hole through the lid bottom, and an entire remaining portion of the lid bottom beyond the single hole is impervious to fluid flow.

12. The cooking utensil of claim 11, wherein the single hole is nonconcentric with the outer periphery of the lid.

13. The cooking utensil of claim 11, wherein the single hole has a hole diameter, the cooking chamber has a cooking chamber volume, and a ratio of the cooking chamber volume divided by the hole diameter is 100 to 300 square centimeters.

14. The cooking utensil of claim 1, wherein the lid bottom has a lower thermal conductivity than that of the pot sidewall.

* * * * *

UNITED STATES PATENT AND TRADEMARK OFFICE
CERTIFICATE OF CORRECTION

| | | |
|---|---|---|
| PATENT NO. | : 8,590,728 B1 | Page 1 of 1 |
| APPLICATION NO. | : 13/438699 | |
| DATED | : November 26, 2013 | |
| INVENTOR(S) | : Mathew A. McPherson | |

It is certified that error appears in the above-identified patent and that said Letters Patent is hereby corrected as shown below:

In the Claims:

Claim 3, at column 9, line 64, the text "The cooking utensil of claim 1" should be replaced by the text --The cooking utensil of claim 2--

Signed and Sealed this
Eighteenth Day of February, 2014

Michelle K. Lee
*Deputy Director of the United States Patent and Trademark Office*